United States Patent
Huang

(10) Patent No.: US 7,464,000 B2
(45) Date of Patent: Dec. 9, 2008

(54) HANDHELD DIAGNOSTIC DEVICE AND METHOD FOR DISPLAYING BITMAPPED GRAPHIC CHARACTERS UTILIZING A CONDENSED BITMAP CHARACTER LIBRARY

(75) Inventor: David Huang, Shanghai (CN)

(73) Assignee: Innova Electronics Corporation, Fountain Valley, CA (US)

( * ) Notice: Subject to any disclaimer, the term of this patent is extended or adjusted under 35 U.S.C. 154(b) by 911 days.

(21) Appl. No.: 10/984,705

(22) Filed: Nov. 9, 2004

(65) Prior Publication Data

US 2005/0171735 A1    Aug. 4, 2005

Related U.S. Application Data

(63) Continuation-in-part of application No. 10/759,655, filed on Jan. 16, 2004, now Pat. No. 7,085,680.

(51) Int. Cl.
*G06F 15/00* (2006.01)
*G06F 19/00* (2006.01)

(52) U.S. Cl. .................. 702/183; 702/119; 702/120; 702/188; 701/33

(58) Field of Classification Search ............ 702/183, 702/119–123, 133, 134, 182–184, 188, 189; 345/173; 717/143, 142; 701/33
See application file for complete search history.

(56) References Cited

U.S. PATENT DOCUMENTS

| | | |
|---|---|---|
| 2,960,654 A | 11/1960 | Nelson |
| 3,646,438 A | 2/1972 | Staff |
| 4,176,315 A | 11/1979 | Sunnarborg |
| 4,207,611 A | 6/1980 | Gordon |
| 4,404,639 A | 9/1983 | McGuire et al. |
| 4,859,932 A | 8/1989 | Whitley |
| 4,884,033 A | 11/1989 | McConchie, Sr. |
| 5,003,478 A | 3/1991 | Kobayashi et al. |
| 5,005,129 A | 4/1991 | Abe et al. |
| 5,107,428 A | 4/1992 | Bethencourt et al. |
| 5,157,708 A | 10/1992 | Garthwaite et al. |
| 5,214,582 A | 5/1993 | Gray |
| 5,247,245 A | 9/1993 | Nelson |
| 5,278,508 A | 1/1994 | Bowman |
| 5,285,163 A | 2/1994 | Liotta |
| 5,359,290 A | 10/1994 | Cervas |
| 5,394,093 A | 2/1995 | Cervas |
| 5,400,018 A | 3/1995 | Scholl et al. |
| 5,481,906 A | 1/1996 | Nagayoshi et al. |
| 5,491,418 A | 2/1996 | Alfaro et al. |

(Continued)

OTHER PUBLICATIONS

Sunpro Sensor Testers Product Comparison (4 pages), 1995.

(Continued)

*Primary Examiner*—Eliseo Ramos Feliciano
*Assistant Examiner*—Phuong Huynh
(74) *Attorney, Agent, or Firm*—Stetina Brunda Garred & Brucker

(57) ABSTRACT

A handheld diagnostic device and method for displaying bitmapped graphic characters is provided which utilizes a condensed bitmap library. In particular, the present invention provides a method for condensing extremely large graphically-based bitmapped character sets, such as Chinese, Japanese, Korean or any other graphically-based bitmapped character set, and storing them in simple and economical handheld automotive diagnostic devices.

14 Claims, 5 Drawing Sheets

U.S. PATENT DOCUMENTS

| | | | |
|---|---|---|---|
| 5,506,772 | A | 4/1996 | Kubozono et al. |
| 5,541,840 | A | 7/1996 | Gurne et al. |
| 5,657,233 | A | 8/1997 | Cherrington et al. |
| 5,758,300 | A | 5/1998 | Abe |
| 5,916,286 | A | 6/1999 | Seashore et al. |
| 6,225,898 | B1 | 5/2001 | Kamiya et al. |
| 6,263,265 | B1 | 7/2001 | Fera |
| 6,295,492 | B1 | 9/2001 | Lang et al. |
| 6,330,499 | B1 | 12/2001 | Chou et al. |
| 6,535,802 | B1 | 3/2003 | Kramer |
| 6,687,584 | B2 | 2/2004 | Andreasen |
| 2002/0193925 | A1 | 12/2002 | Funkhouser et al. |
| 2003/0060953 | A1 | 3/2003 | Chen |
| 2005/0073503 | A1* | 4/2005 | Fudali et al. ............... 345/173 |

OTHER PUBLICATIONS

Sunpro Sensor Tester Plus (1 page), undated.
OTC's Latest Innovations (6 pages), 1989.
OTC Diagnostic Testers and Tools for the Professional (20 pages), undated.
OTC System 2000 Diagnostic Testers and Tools (24 pages), undated.
EPA Performing Onbard Diagnostic System Checks as Part of a Vehicle Inspection and Maintenance Program (25 pages) Jun. 2001.
Equus Products, Inc. Catalog, pp. 1-6 (1998).
Equus Products, Inc. Catalog, Automotive Testers, Gauge and Tachometers and Cruise Control, pp. 1-4 (1995).
Sunpro Catalog by Actron, p. 3-8 (Nov. 1996).
Innova Electronics Corporation Brochure, 3100 OBD II Code Rader (2001).

* cited by examiner

HANDHELD DIAGNOSTIC DEVICE AND METHOD FOR DISPLAYING BITMAPPED GRAPHIC CHARACTERS UTILIZING A CONDENSED BITMAP CHARACTER LIBRARY

CROSS-REFERENCE TO RELATED APPLICATIONS

The present application is a continuation-in-part (CIP) application filed under 37 C.F.R. 1.53(b), which claims the benefit under 35 U.S.C. § 120 of non-provisional U.S. application No. 10/759,655 to David Huang, entitled "Vehicle Diagnostic Tool", filed on Jan. 16, 2004 now U.S. Pat. No. 7,085,680, the disclosure of which is expressly incorporated by reference herein in its entirety. The present application is also related to U.S. application Ser. No. 10/898,268 to Andreasen et al., entitled "Scan Tool User Interface", filed on Jul. 22, 2004, the disclosure of which is expressly incorporated by reference herein in its entirety.

STATEMENT RE: FEDERALLY SPONSORED RESEARCH/DEVELOPMENT

Not Applicable

BACKGROUND OF THE INVENTION

The present invention relates to handheld diagnostic tools, and more particularly, to handheld automotive diagnostic tools which display language characters derived from graphically-based bitmapped character sets, such as Chinese, Japanese and Korean fonts.

There are a wide array of automotive diagnostic tools available today. One specialized sector of the market includes handheld diagnostic devices and code readers which are compatible with standardized platforms, such as OBD-I/II protocol systems. Many of these handheld automotive devices have simple and economical designs which are targeted for use by do-it-yourself mechanics. One ongoing challenge in creating such niche market devices is being able to provide the consumer more features/functionality, while maintaining the cost per unit to a minimum. To provide additional features, typically faster processors, sophisticated programming and more memory is required. As a result, the cost to manufacture the handheld devices typically increases.

This problem is even further magnified when the device is required to display data in graphic-oriented character bitmaps, instead of conventional binary characters (such as ASCII type characters) which utilize significantly less memory. For instance, most East Asian languages are generated via bitmaps character sets. Chinese, Japanese and Korean fonts have extremely large character sets, typically ranging anywhere from 7,000 to 18,000 characters. As a result, Asian fonts typically require about 6-12 MB of memory for storage. Such a memory requirement is quite often too large for handheld automotive diagnostic devices which are targeted to be competively and/or economically priced for consumer's having limited financial resources.

Currently there are numerous commercially and freely available graphically-based bitmapped character/font sets in many different font file formats for a variety of languages which can be utilized in the handheld diagnostic devices. The most prevalently used East Asian languages having graphically-based bitmapped character/font sets includes Japanese, Korean, Simplified Chinese, Traditional Chinese, Generic Chinese and Vietnamese. For each of the aforementioned languages, graphically-based bitmapped character/font sets have been developed for displaying communications on computer based systems. For instance, available Japanese code sets based in Kanji include the following graphic-based code sets: Japanese JIS Codes, Taiwanese Big5, Taiwanese CNS, CCCII and EACC.

The first character code designed to make the processing of ideographic characters on computers possible was the JIS C 6226-1978. This standard was updated with an additional set of 5800 characters which created the JIS X 0208-1990 code set. Big5 defines 13051 Chinese characters, arranged in two parts according to their frequency of usage. The arrangement within these parts is by number of strokes, then Kangxi radical. CNS X-11643-1986 and CNS X-11643-1992 is the Chinese National Code for Taiwan. In the form published in 1992, it defines the glyph-shape, stroke count and radical heading for 48027 characters. CCCII is a very large codeset developed and maintained by the Chinese Character Research Group in Taipei. CCCII currently defines 75000 code points. UNICODE is the upcoming new standard not only for East Asian but for a large number of other scripts of the world.

It would be desirable to provide a handheld automotive diagnostic device for displaying any of the aforementioned bitmapped graphic character sets which utilizes a minimum amount of memory to store at least portions of the graphic character sets. In particular, it would be beneficial to provide a handheld automotive device and method for efficiently storing selected characters from large East Asian language character sets, such as Chinese, Japanese and/or Korean character sets or any other language which may be displayed by bitmaps.

BRIEF SUMMARY OF THE INVENTION

According to a first embodiment of the present invention, a method is provided for displaying diagnostic trouble codes and affiliated definitions of the diagnostic trouble codes on a handheld electronic diagnostic device, the definitions comprising at least one language character derived from a bitmap which is configured to be displayed graphically.

The method includes determining a desired language to be communicated via the diagnostic device; obtaining a library of bitmap fonts and affiliated identification codes representative of a comprehensive character set from the desired language; compiling a unique set of characters from the comprehensive character set that are to be displayed by the device; and generating a condensed library of bitmap fonts and affiliated identification codes representative of the unique character set.

According to another aspect of the present invention, the method may further include compiling a list of diagnostic trouble codes and affiliated definitions to be utilized by the device. According to another aspect of the present invention, the method includes generating a composite code representative of each definition of each diagnostic trouble code, wherein each composite code is a compilation of the affiliated identification codes making up the definition of a respective diagnostic trouble code.

According to a further embodiment of the present invention, the method may include generating a composite code table comprising the list of the diagnostic trouble codes and respective composite codes. According to other aspects of the present invention, the method may include storing the condensed library of bitmap fonts and the composite code table in memory of the device. According to another aspect of the present invention, the method includes receiving at least one diagnostic trouble code into the device from an on-board computer of a vehicle.

According to yet another aspect of the present invention, the method may further comprise displaying the received at least one diagnostic trouble code from the device. Additionally, another aspect of the present invention may include referring to the composite code table to find the composite code correlated to the received at least one diagnostic trouble code.

Furthermore, according to another aspect of the present invention, the method may include decoding the composite code correlated to the received at least one diagnostic trouble code to derive the definition affiliated with the received at least one diagnostic trouble code by identifying each bitfont correlated to the identification codes representative of each bitfont. Also, according to still yet another aspect of the present invention, the method may include displaying the definition affiliated with the received at least one diagnostic trouble code by displaying each identified bitfont which makes up the definition affiliated with the received at least one diagnostic code.

According to a second embodiment of the present invention, a handheld diagnostic device is provided for receiving diagnostic trouble codes from an on-board vehicular computer. The device is adapted for displaying the retrieved diagnostic trouble codes and affiliated definitions, wherein the definitions include at least one language character derived from a bitmap which is configured to be displayed graphically.

The handheld diagnostic device may comprise a handheld device containing a central processor unit, ROM, SRAM, flash memory, an input port, keypad, and display; and a computer readable medium for displaying diagnostic trouble codes and affiliated definitions of the diagnostic trouble codes on the display.

The computer readable medium may comprise a source code segment which provides a condensed library of bitmap fonts and affiliated identification codes representative of the unique character set selected from a comprehensive character set representative a language, wherein the unique set of characters are displayed by the device; and a source code segment which provides a list of diagnostic trouble codes and affiliated definitions to be utilized by the device.

According to another aspect of the present invention, the device further includes a source code segment for providing a composite code table comprising the list of the diagnostic trouble codes and respective composite codes representative of each definition of each diagnostic trouble code, wherein each composite code is a compilation of the affiliated identification codes making up the definition of a respective diagnostic trouble code.

According to another aspect of the present invention, the device includes a source code segment for receiving at least one diagnostic trouble code into the device from an on-board computer of a vehicle. According to another aspect of the present invention, the device further includes a source code segment for displaying the received at least one diagnostic trouble code and from the device. According to another aspect of the present invention, the device further includes a source code segment which refers to the composite code table to find the composite code correlated to the received at least one diagnostic trouble code.

According to yet other aspects of the present invention, a source code segment is provided which decodes the composite code correlated to the received at least one diagnostic trouble code to derive the definition affiliated with the received at least one diagnostic trouble code by identifying each bitfont correlated to the identification codes representative of each bitfont. Moreover, other aspects of the present invention further include a source code segment which displays the definition affiliated with the received at least one diagnostic trouble code by displaying each identified bitfont which makes up the definition affiliated with the received at least one diagnostic code.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The present invention is described below in connection with the illustrated embodiments. However, as will be apparent to those of ordinary skill in the art, various alternate embodiments and processing techniques may be implemented which incorporate the same novel structure, function and operation of the embodiments described herein. Moreover, the present invention may has application to diagnosing other vehicles having on-board computers, such as marine vehicles, aircraft, etc. Accordingly, such alternate embodiments and uses are intended to be encompassed within the broader scope and spirit of the invention as described herein.

The present invention provides a handheld diagnostic device and method for displaying bitmapped graphic characters utilizing a condensed bitmap library. And in more particularity, the present invention provides a method for condensing extremely large graphically-based bitmapped character sets, such as Chinese, Japanese, Korean or any other graphically-based bitmapped character set, and storing them in simple and economical handheld automotive diagnostic devices.

The specification first reviews the basic process in which graphic characters are derived from bitmaps. Second, an exemplary handheld automotive diagnostic device is disclosed, according to an aspect of the present invention. Third, an exemplary method is provided for displaying bitmapped graphic characters utilizing a condensed bitmap character library, according to an aspect of the present invention.

An Exemplary Method for Creating Bitmapped Graphic Characters

Figure 1A:
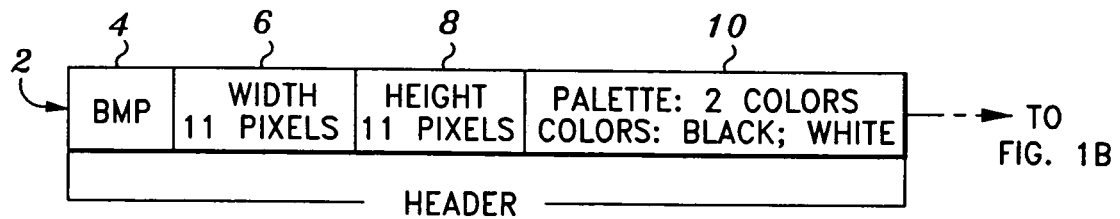
FIGS. 1A-C show an exemplary prior art method for creating bitmapped graphic characters.
Figure 1B:
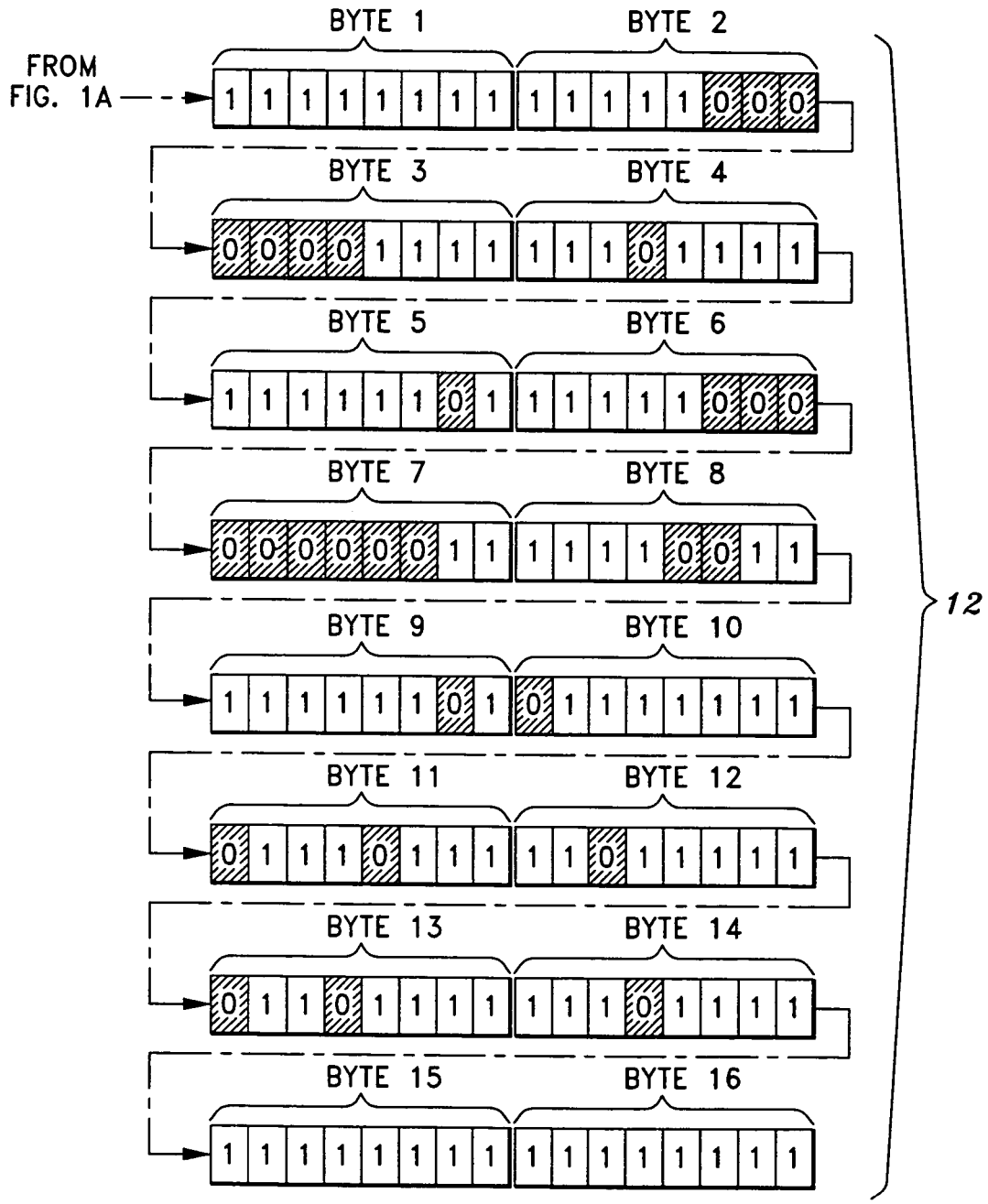
Figure 1C:
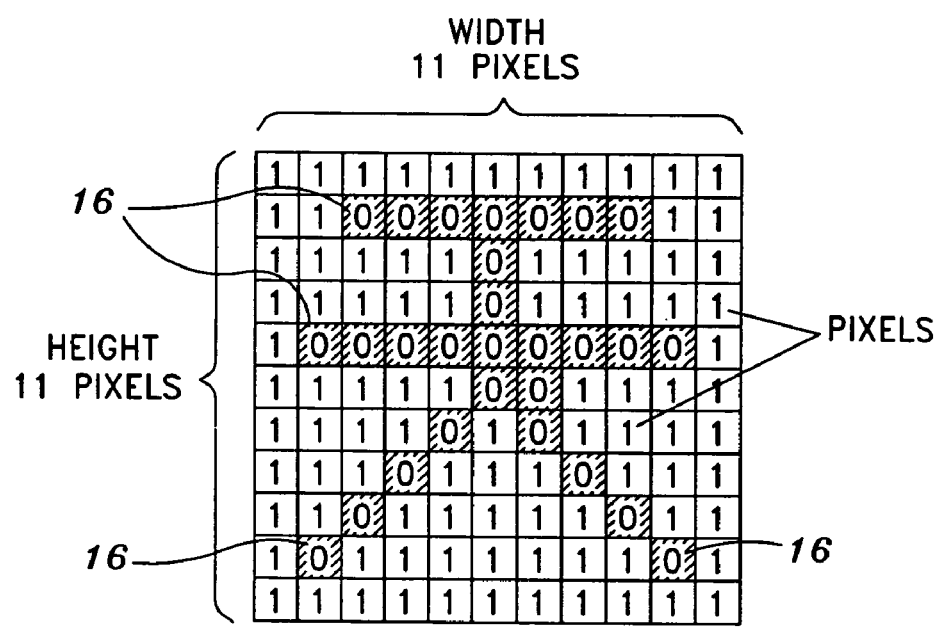

FIGS. 1A-C show an exemplary prior art method for creating bitmapped graphic characters. FIG. 1A shows a bitmapped file's header 2. When a CPU reads a bitmapped file from memory via a graphics display program, it first looks at information contained in the file's header 2, which is several bytes at the beginning of the file that contain information that the graphics display program requires to interpret the data in the rest of the file. The header 2 begins with a signature 4 that identifies the file as a bitmap, which may be indicated by an extension such as .BMP, .PCX, TIF or .JPG. Following the signature 4, the header 2 includes the width 6, and height 8 of the image in pixels, and then defines the palette 10 which specifies how many and which colors are used in the image to be displayed. The characters may be displayed in black-and-white pixels or in color. Color characters require even more information for each pixel displayed than black and white.

FIG. 1B shows the plurality of bytes 12 which contain the specific character information. After determining the parameters of the graphic-based bitmapped character file, the graphic display program reads the bytes of data 12 following the header 2 that contain the image as a pattern of bits as is shown in FIG. 1B. The exemplary process shown uses black-and-white pixels. For images of this type, the graphics display program needs two pieces of information, including the location of a pixel and whether to turn the pixel on or off. The locations of the pixels are determined by the image's width and height as defined in the header 2.

FIG. 1C shows the resulting bitmap 14 with an Asian character image 16 which has been graphically generated. The exemplary character graphic bitmap 14 consists of 121 pixels, which in a black and white image can be stored in 16 bytes. In the memory set aside for graphic display, the bytes that make up the black-and-white image comprise of some bits set to "1" and the rest "0". A "1" means that the pixel that corresponds to that bit should be turned on. A "0" bit indicates a pixel should be turned off.

Exemplary Handheld Automotive Diagnostic Device

Figure 2:
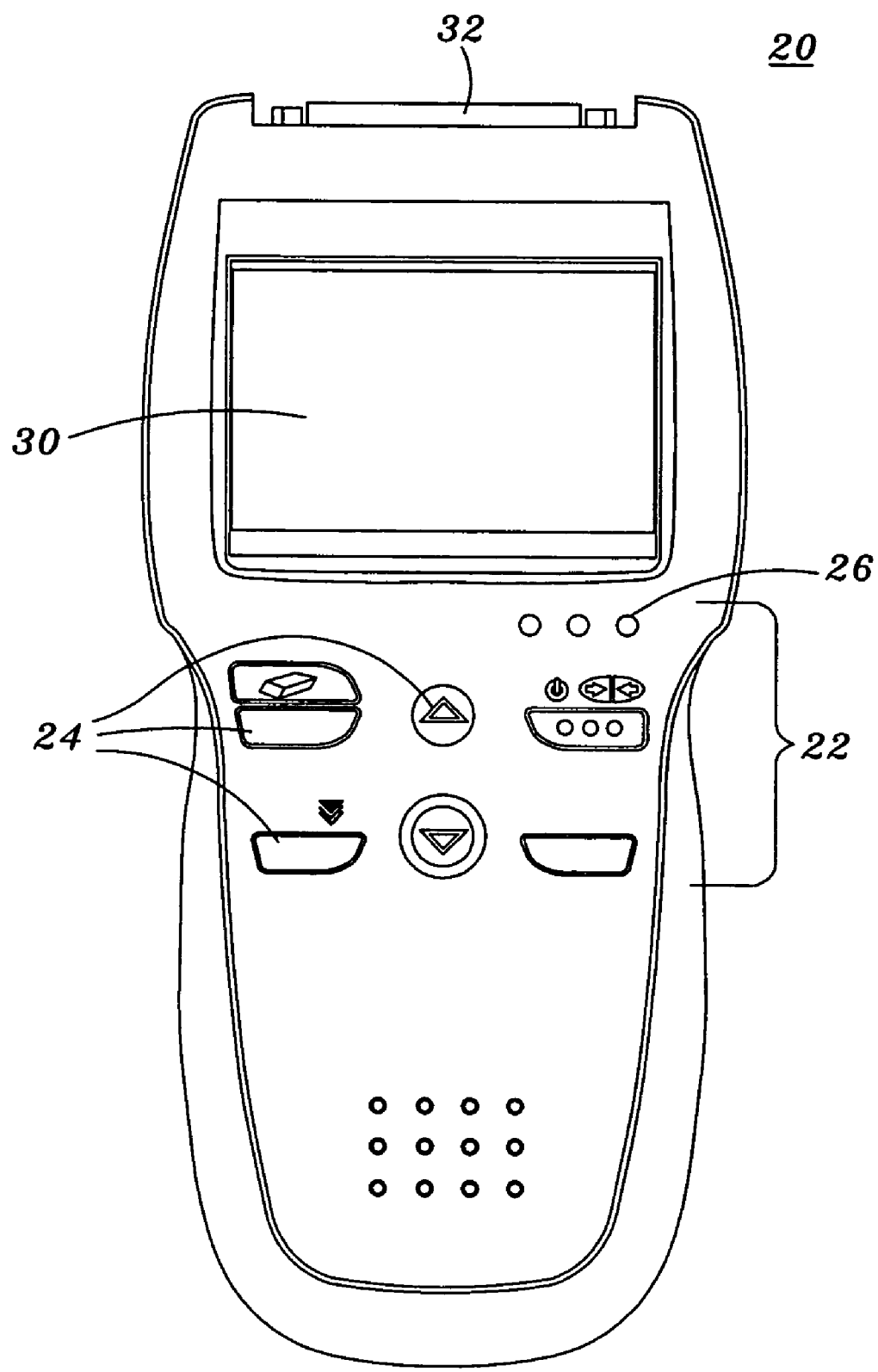
FIG. 2 illustrates an exemplary embodiment of a handheld automotive diagnostic device, according to an aspect of the present invention.

FIG. 2 depicts an exemplary embodiment of a handheld automotive diagnostic device 20, according to an aspect of the present invention. The diagnostic device 20 may include a keypad 22 which provides a plurality of buttons 24 which are utilized to operate the diagnostic device 20. The functionality and operative features of the buttons 24 are beyond the scope of the invention. A display 30 is provided such as a liquid crystal display. A variety of data may be displayed including diagnostic trouble codes (DTC's) and definitions corresponding to the diagnostic trouble codes. Furthermore, other data may be shown on the display 30 symbolizing, representing, and/or indicating various events, conditions, modes, settings, etc. Additionally, a connector interface 32 is provided on the diagnostic device 20 such that it may be connected to an on-board computer of a vehicle via an electrical cable (not shown).

Additionally, a series of indicators 26 may be provided, such as three light emitting diodes (LEDs), to indicate to the user the status of the vehicle. One LED may be associated with a red color and may indicate a failed status of the vehicle; a second LED may be associated with a yellow color and may indicate an inconclusive status of the vehicle; and a third LED may be associated with a green color and may indicate a passed status of the vehicle. The passed/inconclusive statuses of the vehicle may be determined from diagnostic trouble codes stored on the vehicles computer. In the alternative, the three LEDs 26 may be a single multi-colored light which accomplishes the same function as the three LEDs 26.

Figure 3:
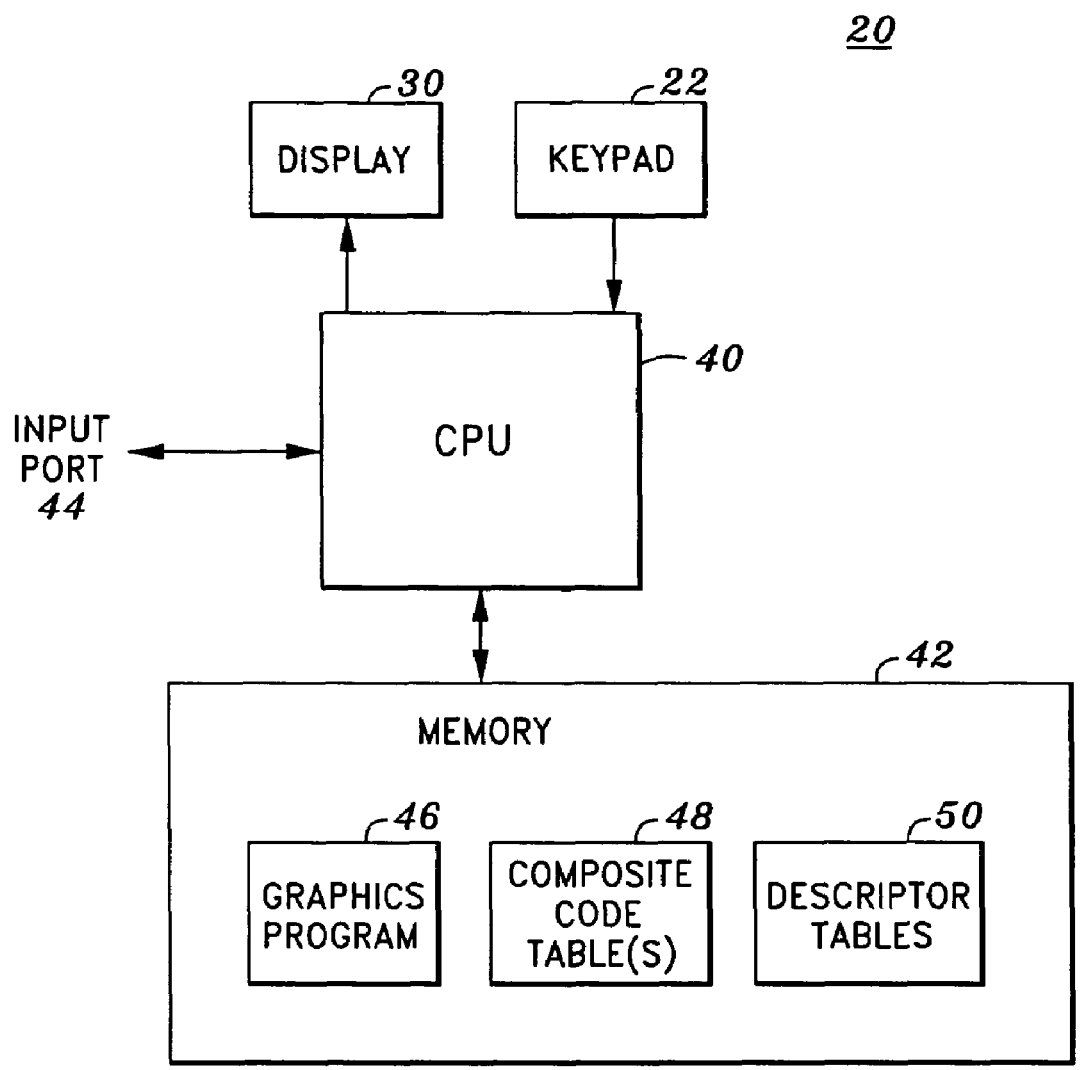
FIG. 3 is a schematic of an exemplary embodiment of the computer architecture of the present invention.

FIG. 3 is an exemplary embodiment of the architecture of the handheld vehicle diagnostic device 20, according to an aspect of the present invention. The device 20 is provided with a central processing unit 40 (CPU) in which digital processing may be performed. The device 20 further includes memory 42 which may comprise a variety of memory devices such as ROM, RAM, SRAM, flash memory or any other form of memory utilized in electronic devices. Included in the memory is a graphics display program 46, composite code table(s) 48 and descriptor table(s) 50. The composite code tables(s) 48 and descriptor tables(s) 50 will be discussed in further detail later in the specification. Preferably, an LCM display module 30 and a keypad 22 are electrically connected to the CPU 40. Additionally an input port 44 is provided to input or output data from the CPU 40. A cable (not shown) may be connected to input port 44 and to the vehicle's on-board computer (not shown) so that diagnostic trouble codes may be downloaded into the diagnostic device 20.

It is noted that the aforementioned architecture of the diagnostic device 20 is merely one example of many different computer/electronic device architecture schemes which may be implemented in the device 20. It is further appreciated that other architecture schemes known in the art that are utilized in similar handheld electronic devices may also be implemented to accomplish the same result. Therefore, the present invention should not be limited to the exemplary architecture shown in FIG. 3.

Figure 4:
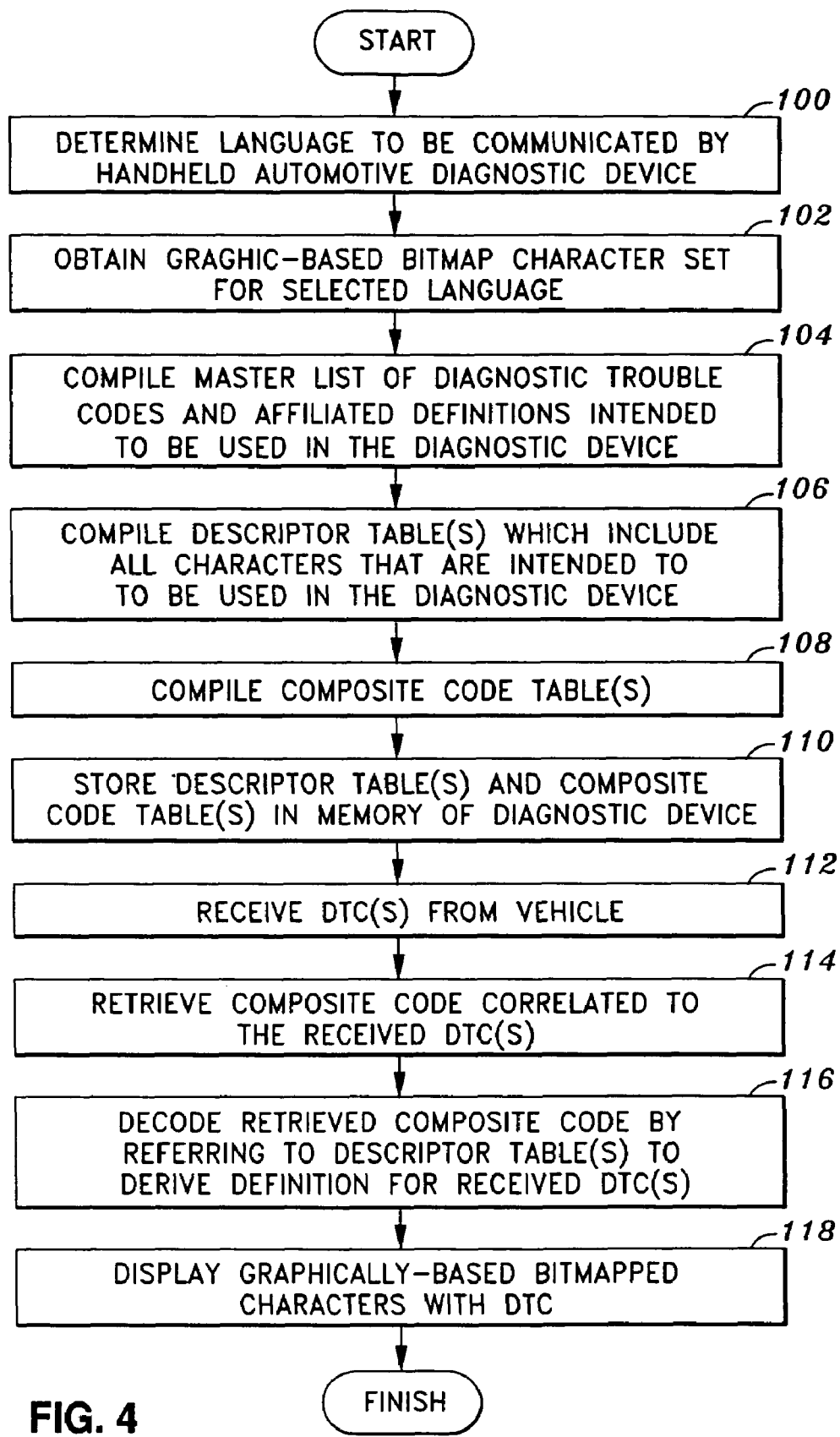
FIG. 4 provides a method for displaying bitmapped graphic characters utilizing a condensed bitmap character library, according to an aspect of the present invention.

An Exemplary Method for Displaying Bitmapped Graphic Characters Utilizing a Condensed Bitmap Character Library FIG. 4 provides an exemplary method for displaying diagnostic trouble codes and affiliated definitions on a handheld electronic automotive diagnostic device 20 in which the definitions comprise at least one language character derived from a bitmap which is configured to be displayed graphically, according to an aspect of the present invention. The method may include the steps as herein now described.

First, the desired language which is to be communicated and displayed from device 20 should be determined, and a respective graphically-based bitmapped character set for the selected language should be obtained (such as JIS Codes, Big5, CNS, CCCII or UNICODE to name a few). For illustrative purposes in this patent application, GB2312-80 Simplified Chinese language code will be used. However, it is noted that the present invention is adapted for any graphically-based bitmapped character set, and thus is not limited to the GB2312-80 code.

First, at step 100 the language to be communicated by the diagnostic device 20 is determined. At step 102, a graphic-based character set which supports the chosen language is procured. At step 104, a comprehensive master list of diagnostic trouble codes and respective definitions for each DTC which is intended to be used in the handheld diagnostic device 20 is compiled. For instance, the master list may include diagnostic trouble codes and definitions selected from the OBD-I or OBD-II standards. Moreover, the master list may be an abbreviated list representative of those DTC's and definitions that are only needed in a specific device 20 having limited applications. To conserve memory resources, only the DTC's that are needed to support the diagnostic devices having specific applications need to be compiled.

An exemplary English master list is shown in Table 1, while an exemplary master list in Simplified Chinese of the same DTC's is shown in Table 2. It is noted that the master lists shown in Tables 1 and 2 are abbreviated lists provided for illustrative purposes only, and that the length of the master list may contain as many DTC's and definitions as the manufacturer sees fit.

ENGLISH:

TABLE 1

| DTC | Definitions |
| --- | --- |
| P0710 | Transmission Fluid Temperature Sensor A Circuit |
| P0711 | Transmission Fluid Temperature Sensor A Circuit Range/Performance |

TABLE 1-continued

| DTC | Definitions |
|---|---|
| P0712 | Transmission Fluid Temperature Sensor A Circuit Low Input |
| P0713 | Transmission Fluid Temperature Sensor A Circuit High Input |
| P0714 | Transmission Fluid Temperature Sensor A Circuit Intermittent |

SIMPLIFIED CHINESE:

TABLE 2

| DTC | Definitions |
|---|---|
| P0710 | 变速装置 流体温度计调计 一个 线路 |
| P0711 | 变速装置 流体温度计调计 一个 线路范围/性能 |
| P0712 | 变速装置 流体温度计调计 一个 线路低输入 |
| P0713 | 变速装置 流体温度计调计 一个 线路高输入 |
| P0714 | 变速装置 流体温度计调计 一个 线路间歇的 |

From Table 1, it can be seen that in English nine total words or groups of words (and or phrases, symbols, characters or numbers) are used in the affiliated descriptions for DTC's P0710 through P0714, including "Transmission", "Fluid Temperature Sensor", "A", "Circuit", "Range/Performance", "Low", "High", "Input", and "Intermittent". Thus, an identification code, e.g. [1] through [9], may be assigned to each word or groups of words.

Moreover, from Table 2, it can be seen that in Simplified Chinese, nine total groups of Chinese characters are used in the affiliated descriptions for DTC's P070 through P0714, including "流体温度计测计", "一个", "线路", "范围/性能", "低", "高", "输入" and "间歇的".

With regard to graphically-based character bit maps, each character typically has an identification code which is correlated to each character. For instance, the character "低" is correlated to identification code [2145] and the symbol "高" is correlated to identification code [2463]. And if the word or group of words is express with a plurality of characters, it then may be identified by a series of identification codes. For instance, the plurality of characters "流体温度计测计" may be identified by a series of identification codes such as [3387 4469 4634 2240 2838 1866 2838]. These identification codes may then be used to build at least one descriptor table which is now herein described below.

From the master list, at least one descriptor table is generated in which words or a plurality of words from the descriptions are represented by at least one language character which can be graphically displayed by a bitmap. An exemplary English descriptor table for DTC's P0710 through P0714 is shown below in Table 3, while the same exemplary descriptor table in Simplified Chinese is shown in Table 4. It is noted that in the exemplary Simplified Chinese descriptor table, since a plurality of characters may be required to describe a word or phrase of words, then a plurality of identification codes may be required in the descriptor table. For instance, since the word "Transmission" is represented by the four Chinese characters "变速装置" then the identification codes assigned by the GB2312-80 code, allow the aforementioned characters to be called up by the assigned identification codes [1768 4357 5516 5453].

ENGLISH:

TABLE 3

| [1]: | Transmission |
|---|---|
| [2]: | Fluid Temperature Sensor |
| [3]: | A |
| [4]: | Circuit |
| [5]: | Range/Performance |
| [6]: | Low |
| [7]: | High |
| [8]: | Input |
| [9]: | Intermittent |

SIMPLIFIED CHINESE:

TABLE 4

| [1768 4357 5516 5453]: | 变速装置 |
|---|---|
| [3387 4469 4634 2240 2838 1866 2838]: | 流体温度计调计 |
| [5027 2486]: | 一个 |
| [4763 3423]: | 线路 |
| [2322 4603 4852 3660]: | 范围/性能 |
| [2145]: | 低 |
| [2463]: | 高 |
| [4278 4075]: | 输入 |
| [2868 4810 2136]: | 间歇的 |

To further save memory resources, it is noted that only the graphically based bitmapped characters from the selected character set which are required to describe the words in the DTC's which support the device 20, need to be used. Thus, instead of having to load an entire graphically based bitmapped set of characters in the device 20, only the characters required for the DTC's required to support the specific tool's requirements are utilized. As a result, the graphically based character set can be condensed into a bitmap character library that supports only the DTC's that are utilized in the tool.

At step 108, a composite code table containing a list of diagnostic trouble codes correlating to the master list is compiled, wherein each of the diagnostic trouble codes have an affiliated codified definition referred to as a "composite code". The composite code for each DTC is generated by listing the identification codes for each word or phrase as defined from the descriptor tables. For instance, a portion of an exemplary composite code table representing diagnostic codes P0710 to P0714, is provided to generate the affiliated composite codes as shown in Table 5:

TABLE 5

| P0710: | [1768 4357 5516 5453], [3387 4469 4634 2240 2838 1866 2838], [5027 2486], [4763 3423] |
|---|---|
| P0711: | [1768 4357 5516 5453], [3387 4469 4634 2240 2838 1866 2838], [5027 2486], [4763 3423], [2322 4603 4852 3660] |
| P0712: | [1768 4357 5516 5453], [3387 4469 4634 2240 2838 1866 2838], [5027 2486], [4763 3423], [2145], [4278 4075] |
| P0713: | [1768 4357 5516 5453], [3387 4469 4634 2240 2838 1866 2838], [5027 2486], [4763 3423], [2463], [4278 4075] |
| P0714: | [1768 4357 5516 5453], [3387 4469 4634 2240 2838 1866 2838], [5027 2486], [4763 3423], [2868 4810 2136] |

At step 110, the descriptor tables and the composite code table(s) are stored in memory 42 of the handheld automotive diagnostic device 20. The descriptor tables and the composite code table may be part of a program written in any computer language (e.g. source code segments). By using the aforementioned condensed bitmap library scheme, all diagnostic trouble codes and definitions required for a diagnostic device 20 may be stored in the device's memory 42 utilizing minimal memory.

In step 112, at least one diagnostic trouble code from an on-board computer of a vehicle is received into the central processor unit 40 of the automotive diagnostic device 2 and may further be stored in memory 42. After the DTC is received from the vehicle, the composite code that is correlated to the DTC is retrieved from the composite code table in step 114. Next at 116, the retrieved composite code is decoded by referring to the descriptor table(s) so that the definition of the DTC may be derived. Once the DTC definition has been derived, it may then be displayed along with the DTC on the device display 30.

In accordance with various embodiments of the present invention, the methods described herein may be implemented as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual processing can also be constructed to implement the methods described herein.

It should also be noted that the software implementations of the present invention as described herein are optionally stored on a tangible storage medium, such as: a magnetic medium such as disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and includes art recognized equivalents and successor media, in which the software implementations herein are stored.

Although the present invention includes components and functions in the embodiments with reference to particular standards (e.g., OBI, OBII), the invention is not limited to such standards and protocols. Such standards are periodically superseded by faster or more efficient equivalents having essentially the same functions. Accordingly, replacement standards and protocols having the same functions are considered equivalents.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A method for displaying diagnostic trouble codes and affiliated definitions of the diagnostic trouble codes on a handheld electronic diagnostic device, the definitions comprising at least one language character derived from a bitmap which is configured to be displayed graphically, the method comprising:

determining a desired language to be communicated via the diagnostic device;

obtaining a library of bitmap fonts and affiliated identification codes representative of a comprehensive character set from the desired language;

compiling a unique set of characters from the comprehensive character set that are to be displayed by the device; and generating a condensed library of bitmap fonts and affiliated identification codes representative of the unique character set;

compiling a list of diagnostic trouble codes and affiliated definitions to be utilized by the device; and generating a composite code representative of each definition of each diagnostic trouble code, wherein each composite code is a compilation of the affiliated identification codes making up the definition of a respective diagnostic trouble code.

2. The method according to claim 1, further including generating a composite code table comprising the list of the diagnostic trouble codes and respective composite codes.

3. The method according to claim 2, further including storing the condensed library of bitmap fonts and the composite code table in memory of the device.

4. The method according to claim 3, further comprising receiving at least one diagnostic trouble code into the device from an on-board computer of a vehicle.

5. The method according to claim 4, further comprising displaying the received at least one diagnostic trouble code and from the device.

6. The method according to claim 4, further comprising referring to the composite code table to find the composite code correlated to the received at least one diagnostic trouble code.

7. The method according to claim 6, further comprising decoding the composite code correlated to the received at least one diagnostic trouble code to derive the definition affiliated with the received at least one diagnostic trouble code by identifying each bitfont correlated to the identification codes representative of each bitfont.

8. The method according to claim 7, further comprising displaying the definition affiliated with the received at least one diagnostic trouble code by displaying each identified bitfont which makes up the definition affiliated with the received at least one diagnostic code.

9. A handheld diagnostic device for receiving diagnostic trouble codes from an on-board vehicular computer, and displaying the retrieved diagnostic trouble codes and affiliated definitions, the definitions comprising at least one language character derived from a bitmap which is configured to be displayed graphically, the handheld diagnostic device comprising:

a handheld device containing a central processor unit, ROM, SRAM, flash memory, an input port, keypad, and display; and a computer readable medium for displaying diagnostic trouble codes and affiliated definitions of the diagnostic trouble codes on said display, the computer readable medium comprising:

a source code segment which provides a condensed library of bitmap fonts and affiliated identification codes representative of the unique character set selected from a comprehensive character set representative a language, wherein the unique set of characters are displayed by the device; and a source code segment which provides a list of diagnostic trouble codes and affiliated definitions to be utilized by the device;

a source code segment for providing a composite code table comprising the list of the diagnostic trouble codes and respective composite codes representative of each definition of each diagnostic trouble code, wherein each composite code is a compilation of the affiliated identification codes making up the definition of a respective diagnostic trouble code.

10. The handheld diagnostic device according to claim 9, further comprising a source code segment for receiving at least one diagnostic trouble code into the device from an on-board computer of a vehicle.

11. The handheld diagnostic device according to claim 10, further comprising a source code segment for displaying the received at least one diagnostic trouble code and from the device.

12. The handheld diagnostic device according to claim 11, further comprising a source code segment which refers to the composite code table to find the composite code correlated to the received at least one diagnostic trouble code.

13. The handheld diagnostic device according to claim 12, further comprising a source code segment which decodes the composite code correlated to the received at least one diagnostic trouble code to derive the definition affiliated with the received at least one diagnostic trouble code by identifying each bitfont correlated to the identification codes representative of each bitfont.

14. The handheld diagnostic device according to claim 13, further comprising a source code segment which displays the definition affiliated with the received at least one diagnostic trouble code by displaying each identified bitfont which makes up the definition affiliated with the received at least one diagnostic code.

* * * * *